(12) United States Patent
Sah

(10) Patent No.: US 8,475,329 B2
(45) Date of Patent: Jul. 2, 2013

(54) SIMULTANEOUS AUTO-START AND ASYNCHRONOUS SHIFT FOR A HYBRID VEHICLE

(75) Inventor: Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 13/188,756

(22) Filed: Jul. 22, 2011

(65) Prior Publication Data

US 2013/0023380 A1 Jan. 24, 2013

(51) Int. Cl.
*B60K 1/02* (2006.01)
(52) U.S. Cl.
USPC .............................................................. 477/3
(58) Field of Classification Search
None
See application file for complete search history.

(56) References Cited

U.S. PATENT DOCUMENTS

| | | | | |
|---|---|---|---|---|
| 8,068,948 B2 * | 11/2011 | Sah et al. | | 701/22 |
| 8,221,285 B2 * | 7/2012 | Heap et al. | | 477/5 |
| 8,282,526 B2 * | 10/2012 | Heap et al. | | 477/5 |
| 8,335,623 B2 * | 12/2012 | Heap et al. | | 701/67 |
| 2009/0118936 A1 * | 5/2009 | Heap et al. | | 701/54 |
| 2010/0228412 A1 | 9/2010 | Sah | | |
| 2010/0298090 A1 | 11/2010 | Sah | | |

* cited by examiner

*Primary Examiner* — Dirk Wright
(74) *Attorney, Agent, or Firm* — Quinn Law Group, PLLC

(57) ABSTRACT

A vehicle includes an engine, a first motor, a second motor, and a gearbox. An oncoming clutch is configured to engage during a transition to a target operating mode to transfer an engine torque to the gearbox during the target operating mode. An off-going clutch is configured to transfer a reactive torque to the gearbox during the transition to the target operating mode. The off-going clutch is configured to be disengaged during at least a portion of the target operating mode. A controller is configured to simultaneously control the off-going clutch and the oncoming clutch during the transition. The controller is configured to control the reactive torque of the off-going clutch using a clutch torque profile associate with the target operating mode and the engagement of the oncoming clutch using a shift profile associated with target operating mode.

13 Claims, 3 Drawing Sheets

SIMULTANEOUS AUTO-START AND ASYNCHRONOUS SHIFT FOR A HYBRID VEHICLE

TECHNICAL FIELD

The disclosure relates to powertrain control in a hybrid electric vehicle.

BACKGROUND

Passenger and commercial vehicles, including hybrid electric vehicles (HEVs), use various clutches to transfer torque between vehicle components. In an HEV, clutches are used to transfer torque generated by an engine and/or one or more electric motors to the drive wheels of the vehicle. Multiple clutches may be used to allow the HEV to operate in various operating modes, e.g., engine only, motor only/electric vehicle (EV), fixed gear, etc.

SUMMARY

In a multi-mode hybrid transmission, it may be desirable to operate at a higher electric vehicle (EV) speeds for optimal fuel economy. Normally, this is accomplished by executing an engine auto-start event during coast down from a higher mode, e.g., a higher speed EV mode. A synchronous shift is then performed through a fixed gear to a lower operating mode. However, this process can be relatively time consuming, and if vehicle speed is too low, shifting through a fixed gear can be undesirable due to low engine speed. Therefore, the present control approach performs a synchronous shift and auto-start event in parallel to overcome these and other control limitations, as set forth in detail herein.

When an engine auto-start request and a shift request are received by an onboard controller as set forth herein, clutch torque capacity of an off-going output clutch is reduced below a reactive torque level, which will cause the output clutch to begin to slip. Clutch torque capacity is directly proportional to output torque. An engine auto-start profile is generated by the controller according to the desired engine start type. Oncoming clutch slip profile is then generated based on output speed and an engine start speed profile, with two constraints: (1) the target clutch slip is held to zero to enable the synchronous engagement of the oncoming clutch, and (2) the sign of the off-going clutch is maintained to prevent output torque reversal.

In particular, a hybrid electric vehicle (HEV) is disclosed herein which includes an internal combustion engine, as well as first and second electric motors. A gearbox receives engine torque and/or motor torque from the first and/or second electric motors. An oncoming clutch is engaged during a transition to a target operating mode to transfer engine torque to the gearbox. An off-going clutch transfers a reactive torque to the gearbox during the same transition.

The off-going clutch is then disengaged during at least a portion of the target operating mode. The controller simultaneously controls the torque capacity of the off-going clutch and engagement of the oncoming clutch during the transition. The controller is configured to control the reactive torque of the off-going clutch using engine and motor torques associated with the target operating mode. The controller is further configured to control an engagement of the oncoming clutch during the transition using a shift profile, which is likewise associated with the target operating mode.

A method is also disclosed herein which includes identifying a transition to the target operating mode of an HEV having an off-going and an oncoming clutch. The method includes identifying an output torque profile associated with the target operating mode, selecting a clutch torque profile based at least in part on the output torque profile, identifying a speed profile associated with the transition to the target operating mode, and selecting a shift profile based at least in part on the speed profile. The method further includes simultaneously controlling, during the transition to the target operating mode, the reactive torque of the off-going clutch using the selected clutch torque profile and the engagement of the oncoming clutch using the selected shift profile.

The above features and the advantages of the present disclosure are readily apparent from the following detailed description of the best modes for carrying out the invention when taken in connection with the accompanying drawings.

DETAILED DESCRIPTION

Figure 1:
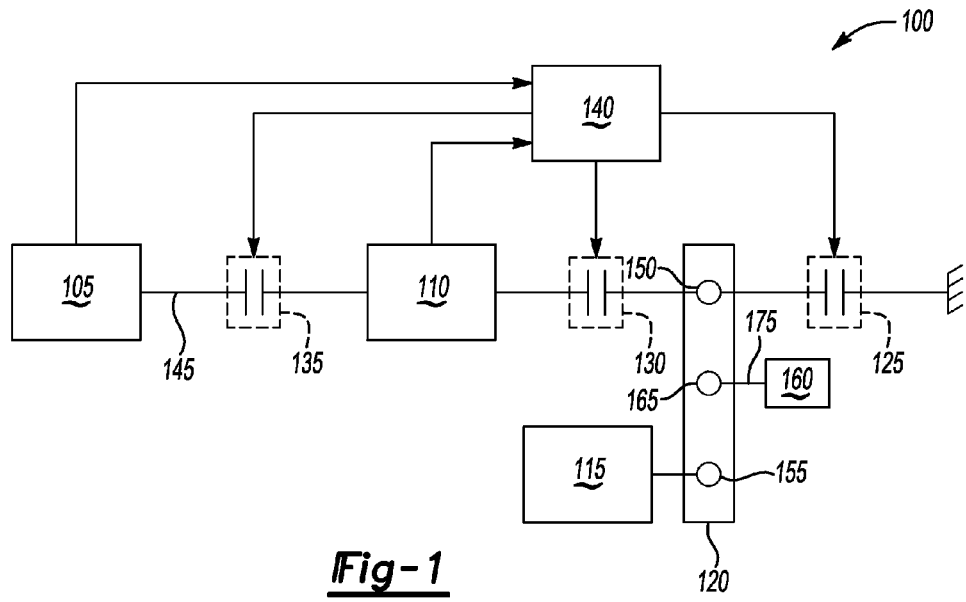
FIG. 1 is a schematic diagram of a hybrid electric vehicle (HEV) having a controller which is configured to asynchronously control an off-going clutch and an oncoming clutch during a transition to a target operating mode.

With reference to the drawings, wherein like reference numbers refer to the same or similar components throughout the several views, an example vehicle 100 is shown in FIG. 1. The vehicle 100 is configured as a hybrid electric vehicle (HEV), for instance a conventional HEV or a plug-in HEV (PHEV). In an example embodiment the vehicle 100 includes an engine 105, a first electric motor 110, and a second electric motor 115. The vehicle 100 may also include a gearbox 120, a first clutch 125, a second clutch 130, a third clutch 135, and a controller 140.

The controller 140, as will be described in detail below, is configured to simultaneously perform an auto-start of the engine 105 during coast down and an asynchronous shift through a fixed-gear mode. As a result, the controller 140 enables higher electric vehicle (EV) speeds in a higher operating mode, shortens the tip-in response time, and isolates output torque during the auto-start and shift events.

A time plot 170 (FIG. 1A) describes various vehicle torque parameters used for executing the present synchronous maneuver. FIG. 1B provides a corresponding speed plot for executing the same maneuver. During this maneuver, remaining clutches may be opened or closed as needed depending on the beginning and ending modes. The various traces are schematic and intended only to illustrate the concept. The actual traces may vary in appearance from those shown.

The torques (traces 174 and 176) of two electric motors, e.g., the first electric motor 110 and the second electric motor 115 of FIG. 1, with their corresponding speeds ($N_A$ and $N_B$ of FIG. 1B), are used to control the input torque (trace 173 of FIG. 1A) and clutch slip profiles (traces 176 and 175) for the first and second clutches 125 and 130, respectively. Input speed ($N_I$) is shown in FIG. 1B, along with the speeds of clutches 125 and 130, i.e., traces $NC_1$ and $NC_2$, respectively.

Figure 1A:
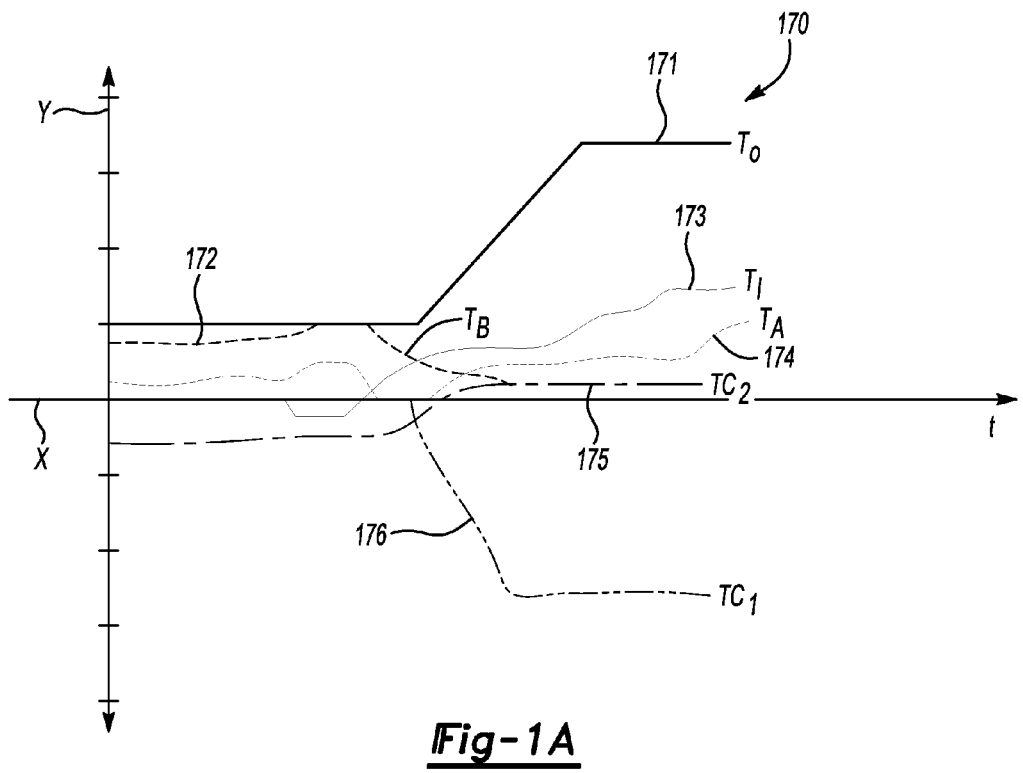
FIG. 1A is a time plot of various vehicle torque parameters used for executing the present method.
Figure 1B:
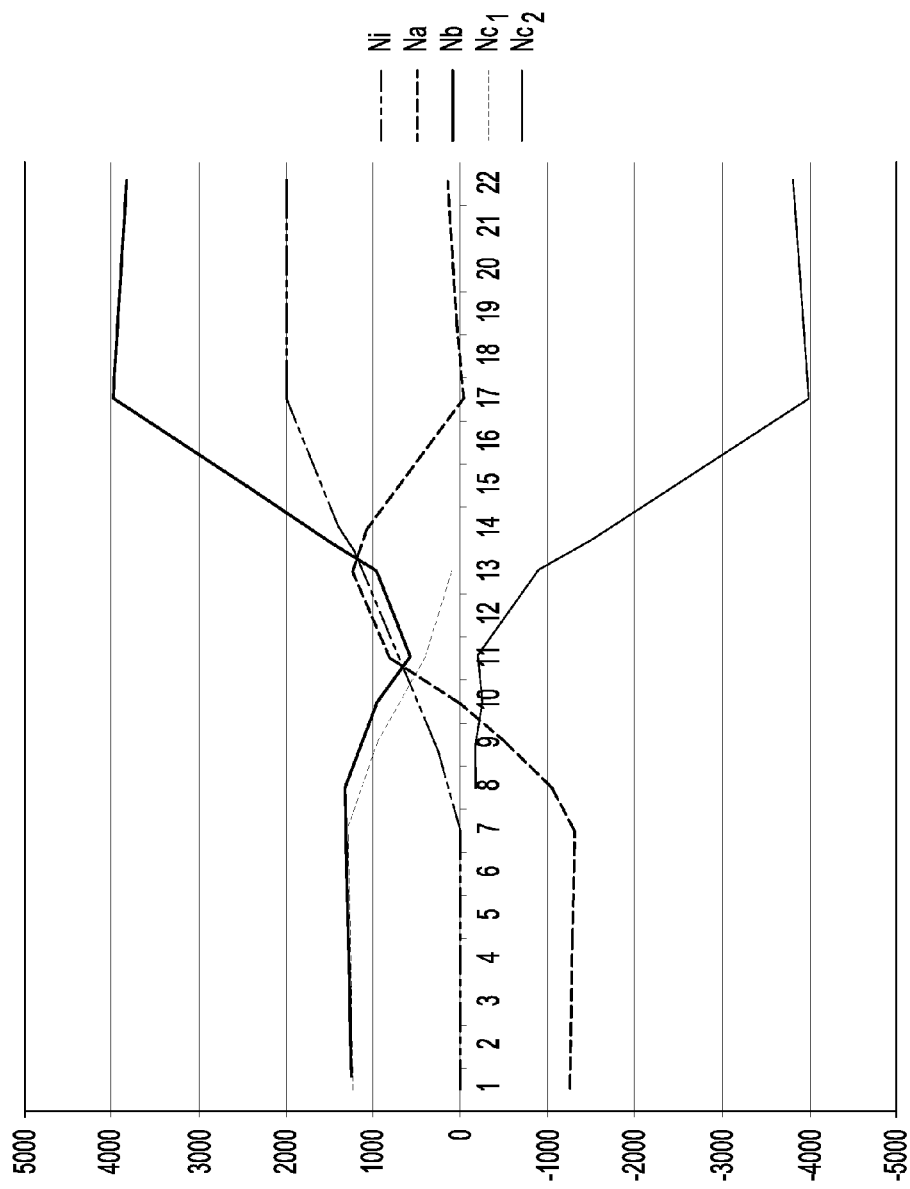
FIG. 1B is a time plot of various vehicle speed parameters used for executing the present method.

This occurs while reacting to the off-going clutch torque (trace 171 of FIG. 1A) and engine drag or combustion torque (trace 173 of FIG. 1A). Motor torque from the first electric motor 110 is represented in FIG. 1A by trace 174. Motor torque from the second electric motor 115 is represented in FIG. 1B by trace 172. Off-going clutch torque (trace 171 of FIG. 1B) is controlled by the off-going clutch pressure.

As can be seen in FIG. 1B, when the oncoming clutch ($Nc_1$) is synchronized, clutch pressure commanded by the controller 140 locks the oncoming clutch. Pressure is removed from the off-going clutch ($Nc_2$), thus completing the shift. When the engine 105 of FIG. 1 spins up (Ni) and starts producing engine torque (trace $T_i$ of FIG. 1A), the controller 140 exits auto-start and the engine 105 is thereafter in a running state. The off-going clutch ($Nc_2$) isolates engine torque pulses from the output shaft. This creates less of an output torque disturbance.

Using this approach, higher EV speeds are enabled in higher modes, shortening tip-in response time. The slipping off-going clutch torque controls the output torque, and one of the motors controls the auto start speed profile while reacting to the slipping clutch torque. As shown in FIG. 1B, the oncoming clutch torque speed profile is coordinated with input speed ($N_I$) to ensure that slip of the off-going clutch is small, thus minimizing clutch energy.

Referring again to FIG. 1, the controller 140 may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc.

In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory.

The profiles used by the controller 140 to simultaneously control the oncoming clutch and the off-going clutch during the transition may be stored in a memory device (not shown) and the information associated with each profile may be arranged in a look-up table, database, data repository, or any other type of data store having various kinds of mechanisms for storing, accessing, and retrieving various kinds of data.

The engine 105 may include any device configured to generate an engine torque by, e.g., converting a fuel into rotational motion. Accordingly, the engine 105 may be an internal combustion engine configured to convert energy from a fossil fuel into rotational motion using a thermodynamic cycle. The engine 105 may be configured to output the engine torque via a crankshaft 145.

The first electric motor 110 may include any device configured to generate a first motor torque by, e.g., converting electrical energy into rotational motion. The first electric motor 110 may be configured to receive electrical energy from a power source (not shown) such as a battery. The power source may be configured to store and output electrical energy, such as direct current (DC) energy. An inverter (not shown) may be used to convert the DC energy from the battery into alternating current (AC) energy. The first electric motor 110 may be configured to use the AC energy from the inverter to generate rotational motion. The first electric motor 110 may be further configured as a generator, i.e., to generate electrical energy when provided with an input torque such as engine torque. For example, the first electric motor 110 may generate AC energy that may be converted by the inverter into DC energy and stored in the power source.

The second electric motor 115 may include any device configured to generate a second motor torque by, e.g., converting electrical energy into rotational motion. Like the first electric motor 110, the second electric motor 115 may be configured to receive electrical energy from the power source either directly or via the inverter. Moreover, the second electric motor 115 may be used as a generator depending on the mode.

Still referring to FIG. 1, the gearbox 120 may include any device configured to convert the engine torque, the first motor torque, and/or the second motor torque into rotational motion (e.g., a propulsion torque) that may be used to propel the vehicle 100. For instance, the gearbox 120 may include a planetary gearset having a plurality of gears of various sizes. The gearbox 120 may be configured to receive the engine torque and/or the first motor torque via a first input node 150, and the second motor torque via a second input node 155. The gearbox 120 may output the propulsion torque to wheels 160 of the vehicle 100 via an output shaft 175 connected to an output node 165. The gearbox 120 of FIG. 1 is illustrated as a lever diagram for clarity.

Each clutch may include any device configured to engage to transfer torque generated by one component of the vehicle 100 to another. The amount of torque transferred may be referred to as a "reactive torque" of the clutch. To transfer the reactive torque, each clutch may include a driving mechanism and a driven mechanism. The driving mechanism may be configured to rotate when provided with, e.g., the engine torque, the first motor torque, the second motor torque, etc. When fully engaged, the driven mechanism may rotate at the same speed as the driving mechanism. When disengaged or partially engaged, the driven mechanism may slip relative to the driving mechanism, meaning that the driving mechanism and the driven mechanism may rotate at different speeds.

While the vehicle 100 may include any number of clutches, a first clutch 125, a second clutch 130, and a third clutch 135 are illustrated in FIG. 1. The first clutch 125 may be grounded (e.g., the driven mechanism is fixed and does not rotate) and operably connected to the first input node 150 of the gearbox 120. When the first clutch 125 is engaged, the first clutch 125 may prevent one or more gears in the gearbox 120 from rotating so that the second motor torque may be transferred from the second input node 155 to the output node 165 to propel the vehicle 100.

The second clutch 130 may be operably disposed between the first electric motor 110 and the first input node 150. When the second clutch 130 is engaged, the first motor torque may be transferred from the first electric motor 110 to the first input node 150 so that the vehicle 100 may be propelled, at least in part, by the first motor torque (e.g., the first motor torque contributes to the propulsion torque).

The third clutch 135 may be operably disposed between the engine 105 and the first motor 110. When the third clutch 135 is engaged, the engine torque may be transferred to the first electric motor 110 so that the first electric motor 110 may act as a generator if the second clutch 130 is disengaged or so that the engine torque alone or in combination with the first motor torque may be transferred to the first input node 150 of the gearbox 120 if the second clutch 130 is engaged.

The vehicle 100 may operate in various modes based on, for example, which of the first clutch 125, the second clutch 130, and/or the third clutch 135 are engaged. That is, the first clutch 125 may be engaged during a first operating mode, a second operating mode, and a fifth operating mode. The second clutch 130 may be engaged during the second operating mode, a third operating mode, and a fourth operating mode. The third clutch 135 may also be engaged during the fourth operating mode, as well as during a fifth operating mode.

Additionally, the second clutch 130 may engage during the transition from the first operating mode to the second operating mode, and the third clutch 135 may engage during the transition from the third operating mode to the fourth operating mode. The first clutch 125 may disengage during the transition to the third operating mode. The second clutch 130 may disengage during the transition to the fifth operating mode and the third clutch 135 may disengage during the transition to the first operating mode.

Each clutch shown in FIG. 1 may be hydraulically actuated. For example, each clutch may be configured to engage when provided with fluid at a minimum threshold, e.g., the capacity of the clutch is commanded to a level above the minimum threshold so that the clutch transfers torque. Each clutch may be further configured to disengage when provided with fluid below the minimum threshold. For instance, the capacity of the clutch is commanded to a level below the minimum threshold, such as zero. A pump or valve body (not shown) may be used to provide the fluid to one or more of the clutches in the vehicle 100, and the amount of fluid provided may be based on a clutch fill command, described in greater detail below.

Furthermore, each clutch may be synchronized, i.e., slip is controlled to zero across the clutch, before the driving mechanism and the driven mechanism are engaged to, for instance, reduce the risk of damaging the clutch upon engagement. In one possible approach, the engine 105, the first electric motor 110, or the second electric motor 115 may be configured to increase or decrease the speed of the driven mechanism of one or more of the clutches to substantially match the speed of the driving mechanism of that same clutch. When the speeds of the driving mechanism and the driven mechanism are substantially the same, the slip speed of the clutch is substantially zero so the clutch may be engaged without a significant risk of damage to that clutch.

By way of example, the third clutch 135, as illustrated in FIG. 1, is disposed between the engine 105 and the first electric motor 110. The engine 105 may be configured to rotate the driving mechanism so that the engine torque is transferred to the first electric motor 110 when the third clutch 135 is engaged. The first electric motor 110, therefore, may be configured to increase or decrease the speed of the driven mechanism of the third clutch 135 to substantially match the speed of the driving mechanism prior to the engagement of the third clutch 135.

The controller 140 may include any device configured to identify a transition from a present operating mode to a target operating mode. Moreover, the controller 140 may determine which clutches engage and/or disengage during the transition, and control those clutches accordingly. For instance, the controller 140 may identify one or more of the clutches that engage during the transition as an oncoming clutch and one or more of the clutches that disengage during the transition as an off-going clutch. In one possible approach, the transition may be to a target operating mode where the engine torque is provided to the gearbox 120 to propel the vehicle 100. In this example, the controller 140 may be configured to identify the oncoming clutch as any clutch that is able to transfer the engine torque to the gearbox 120 and the off-going clutch as any clutch that is disengaged when the engine torque is transferred to the gearbox 120.

The controller 140 may be further configured to simultaneously control the reactive torque of the off-going clutch and the engagement of the oncoming clutch during the transition to the target operating mode, which may allow the vehicle 100 to execute faster transitions. Further, the controller 140 may be configured to disengage the off-going clutch after the oncoming clutch has synchronized and engaged.

In one possible approach, the controller 140 may be configured to select an output torque profile associated with the transition to the target operating mode. The output torque profile may define a desired output torque to the wheels 160 of the vehicle 100 during the transition. The desired output torque may, therefore, define changes in the engine torque, the first motor torque, and/or the second motor torque during the transition.

For example, prior to the transition (e.g., when operating in the present operating mode), the first motor torque and/or the second motor torque may provide the desired output torque. During the transition, the amount of torque provided by the first motor torque, the second motor torque, or both, may be reduced as the engine torque is increased. In this example implementation, the desired output torque may define the decrease in the first motor torque and/or the second motor torque provided to the gearbox 120 and define the increase in the engine torque provided to the gearbox 120.

The controller 140 may be further configured to select a clutch torque profile based on, e.g., the output torque profile. The clutch torque profile may define an expected amount of torque transferred by the off-going clutch during the transition. The expected amount of torque may be a percentage of the torque defined by the output torque profile. The controller 140 may be configured to control the off-going clutch in a way that allows, e.g., the first motor torque, the second motor torque, or both, to provide at least a portion of the desired output torque.

Moreover, the expected amount of torque may change throughout the transition. For instance, the expected amount of torque may decrease as the transition to the target operating mode progresses, and as such, the controller 140 may reduce the reactive torque of the off-going clutch throughout the transition in accordance with the selected clutch torque profile.

Still referring to FIG. 1, in one possible approach, the controller 140 may control the reactive torque of the off-going clutch during the transition by controlling a slip speed of the off-going clutch in accordance with the clutch torque profile. That is, the controller 140 may control the speed differential between the driving mechanism and driven mechanism of the off-going clutch. The controller 140 may be configured to control the speed of the driving mechanism using the engine 105, the first electric motor 110, or the second electric motor 115.

The controller 140 may be configured to control the slip speed by adjusting the capacity of the off-going clutch. For instance, the controller 140 may be configured to increase the capacity of the off-going clutch to reduce the slip speed and reduce the capacity of the off-going clutch to increase the slip speed. The controller 140 may adjust the capacity of the off-going clutch using, e.g., a clutch fill command that commands the amount of fluid provided to the off-going clutch from, for instance, a pump or valve body (not shown). The off-going clutch may be at least partially engaged when the capacity is above the minimum threshold and disengage when the capacity drops below the minimum threshold, as discussed above.

In another approach, the controller 140 may be configured to control the disengagement of the off-going clutch in a way that causes the off-going clutch to slip in an expected rotational direction. This way, the controller 140 may observe the direction of the slip to determine whether, e.g., the off-going clutch slipped in the expected direction. If so, the controller 140 may be configured to confirm that the off-going clutch is disengaged. Moreover, controlling the direction of the slip may prevent output torque reversal. The controller 140 may select the expected slip direction based on various factors including the direction that the driving mechanism rotates while the vehicle 100 is operating in the present operating mode or the direction that the driving mechanism will rotate during a transition to a subsequent target operating mode.

The controller 140 of FIG. 1 may be further configured to control the engagement of the oncoming clutch during the transition using, e.g., a shift profile associated with the target operating mode. The controller 140 may be configured to select the shift profile using a speed profile associated with the target operating mode. The shift profile may define the change in the slip speed of the oncoming clutch during the transition. As such, the shift profile may define the amount of time needed to synchronize and engage the oncoming clutch. The speed profile may define a change in a desired input speed of the gearbox 120 during the transition. The controller 140 may be configured to control the engagement of the oncoming clutch according to the shift profile and the speed profile so that, e.g., the input speed of the gearbox 120 is substantially the same as the desired input speed defined by the speed profile.

The controller 140 may be further configured to control the capacity of the oncoming clutch to, e.g., synchronize the oncoming clutch prior to engaging the oncoming clutch. For instance, the controller 140 may be configured to control the capacity of the oncoming clutch to reduce the slip speed of the driving and driven mechanisms to substantially zero before the oncoming clutch is engaged. As discussed above, synchronizing the oncoming clutch may reduce the risk of damaging the oncoming clutch upon engagement.

In some operating modes described in detail below, the first motor torque, the second motor torque, or both, may provide the torque to propel the vehicle 100. At some point, however, the vehicle 100 may transition to an operating mode that uses the engine torque either alone or in combination with the first and/or second motor torque. Therefore, the controller 140 may be further configured to start the engine 105 (e.g., either directly or via an engine control module) and control the engagement of the oncoming clutch in a way that begins to transfer the engine torque to the gearbox 120 during the transition.

Figure 2:
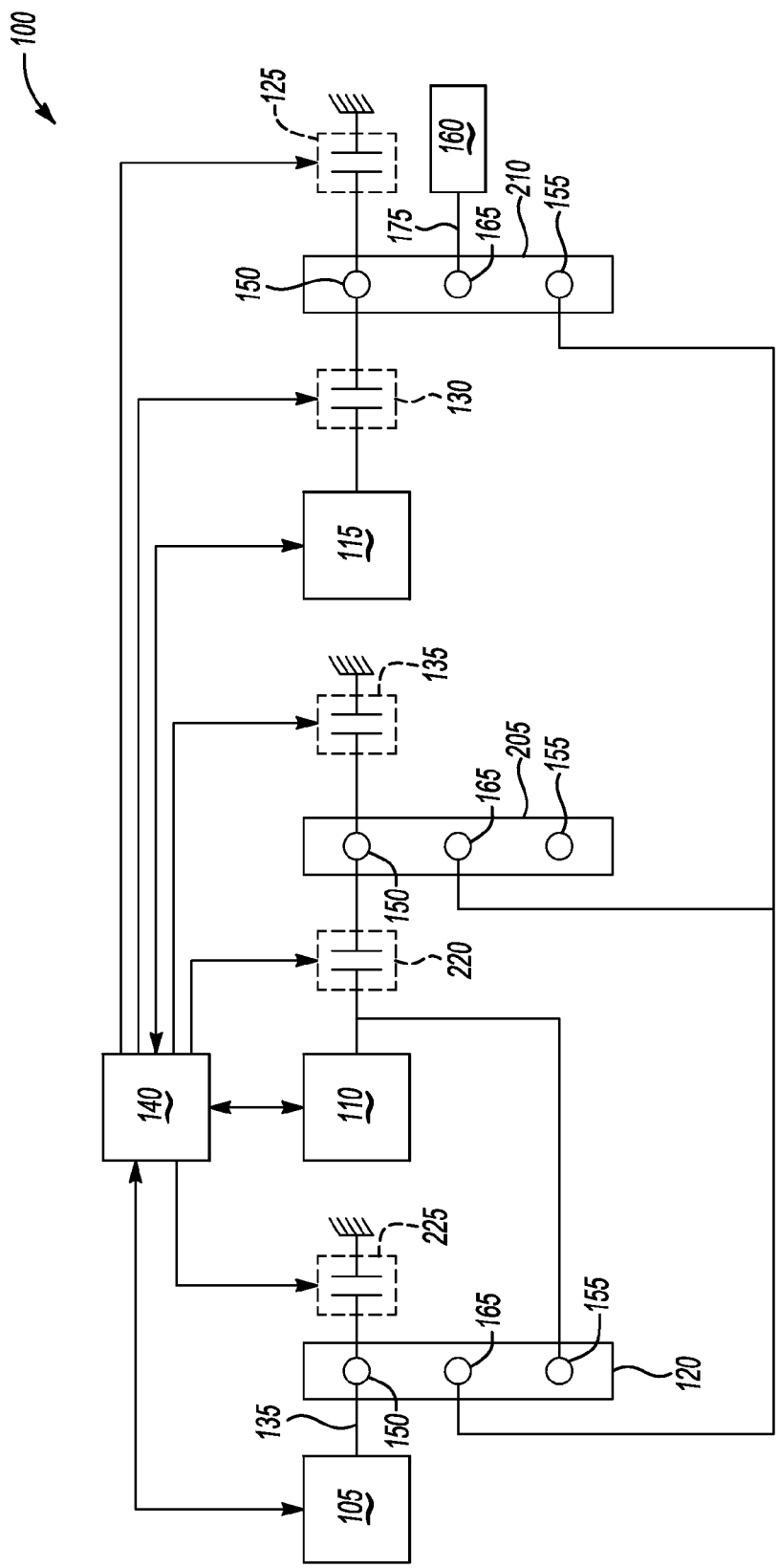
FIG. 2 is a schematic diagram of an HEV configured to asynchronously control the off-going clutch and the oncoming clutch during the transition.

FIG. 2 illustrates another example vehicle 100 having the engine 105, the first electric motor 110, the second electric motor 115, the first gearbox 120, the first, second, and third clutches 125, 130, and 135, and the controller 140 substantially the same as those as discussed above. FIG. 2 further includes lever diagrams of a second gearbox 205 and a third gearbox 210. Moreover, the vehicle 100 of FIG. 2 includes a fourth clutch 220 and a fifth clutch 225 in addition to those illustrated in FIG. 1. The gearboxes 205 and 210 and the additional clutches 220, 225 of FIG. 2 allow, e.g., for the vehicle 100 to operate in more modes than the vehicle 100 of FIG. 1.

The first, second, and third gearboxes 120, 205, and 210 may each represent a planetary gearset having the first input node 150, the second input node 155, and the output node 165 as described above. As illustrated, the first gearbox 120 is configured to receive the engine torque via the first input node 150 and the first motor torque via the second input node 155. The first gearbox 120 is configured to output torque via the output node 165. The second gearbox 205 is configured to receive the first motor torque via the first input node 150 and the second motor torque via the second input node 155. The second gearbox 205 may output torque via the output node 165, which as illustrated, is also configured to receive torque from the output node 165 of the first gearbox 120. The third gearbox 210 is configured to receive the second motor torque via the first input node 150 and the output torque from the first gearbox 120 and/or the second gearbox 205 via the second input node 155. The third gearbox 210 may output torque to the wheels to, e.g., propel the vehicle 100 via the output node 165.

In the example approach of FIG. 2, the first clutch 125 may be grounded (e.g., the driven mechanism is fixed and does not rotate) and operably connected to the first input node 150 of, e.g., the third gearbox 210. The second clutch 130 may be operably disposed between the second electric motor 115 and the third gearbox 210 to, e.g., provide the second motor torque to the third gearbox 210 via the first input node 150 of the third gearbox 210. The third clutch 135 may be grounded to the first input node 150 of the second gearbox 205, and the fourth clutch 220 may be operably disposed between the first electric motor 110 and the first input node 150 of the second gearbox 205. The fifth clutch 225 may be grounded and operably connected to the first input node 150 of the first gearbox 120.

The controller 140 may be configured to engage and disengage these clutches to, e.g., place the vehicle 100 in various operating modes. For instance, the vehicle 100 may operate in a first mode when the first and third clutches 125, 135 are engaged, a second mode when the first and fourth clutches 125, 220 are engaged, a third mode when the second and fourth clutches 130, 220 are engaged, and a fourth mode when the second and third clutches 130, 135 are engaged. The controller 140, therefore, may be configured to identify the first, second, third, or fourth modes as the present operating mode or the target operating mode. Moreover, the controller 140 may be configured to identify the first clutch 125, the second clutch 130, the third clutch 135, the fourth clutch 220, or the fifth clutch 225 as the oncoming or off-going clutch during a transition from the present operating mode to the target operating mode and control each of those clutches accordingly.

By way of example only, the vehicle 100 may be operating in the third mode (e.g., the present operating mode) and the controller 140 may identify a request to shift to the second mode (e.g., the target operating mode). The third mode may represent an operating mode where the first and/or second motor torque is used to propel the vehicle 100 and the second mode may represent an operating mode where the engine torque is used, at least in part, to propel the vehicle 100. As discussed above, the second and fourth clutches 130, 220 may be engaged when operating in the third mode and the first and fourth clutches 125, 220 may be engaged when operating in the second mode.

As such, the controller 140 may be configured to identify the second clutch 130 as the off-going clutch and the first clutch 125 as the oncoming clutch during the transition to the target operating mode. The controller 140 may control the reactive torque of the second clutch 130 and the engagement of the first clutch 125 during the transition in a way that satisfies the output torque profile associated with the target operating mode, as discussed above.

Figure 3:
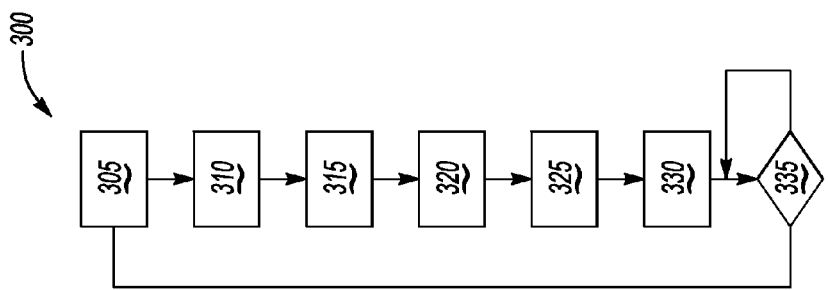
FIG. 3 is a flowchart describing an example embodiment of the present method.

Referring to FIG. 3, this Figure illustrates an example method that may be implemented by the controller 140 to, e.g., control the oncoming clutch and the off-going clutch during a concurrent engine starting/auto-start and transition to the target operating mode.

At block 305, the controller 140 may identify the transition to the target operating mode of the vehicle 100 during engine starting. For instance, the controller 140 may identify the operating mode of the vehicle 100 using various factors including which clutches are engaged, the speed of the vehicle 100, inputs from the driver of the vehicle 100, etc. Moreover, the controller 140 may identify the oncoming clutch and the off-going clutch based on, e.g., the clutches that are engaged in the present operating mode and the clutches that are engaged in the target operating mode.

At block 310, the controller 140 may identify the output torque profile associated with the target operating mode. The output torque profile may define the desired output torque provided to the wheels of the vehicle 100 during the transition.

At block 315, the controller 140 may select the clutch torque profile based, at least in part, on the output torque profile. The clutch torque profile may define an expected amount of torque transferred by the off-going clutch during the transition. The expected amount of torque may be a percentage of the torque defined by the output torque profile.

At block 320, the controller 140 may identify the input speed profile associated with the transition to the target operating mode. The input speed profile may define a change in a desired input speed of the gearbox 120 during the transition.

At block 325, the controller 140 may select clutch slip speed profile based, at least in part, on the identified speed profile. The clutch slip speed profile may define the change in the slip speed of the oncoming clutch during the transition. As such, the clutch slip speed profile may define the amount of time needed to synchronize and engage the oncoming clutch.

At block 330, the controller 140 may simultaneously disengage the off-going clutch and prepare or fill the oncoming clutch during the transition. As understood in the art, an on-coming clutch is filled with fluid to the touch point with no torque capacity. For instance, the controller 140 may control the reactive torque to exceed the torque capacity of the off-going clutch using the selected clutch during the transition. That is, the controller 140 may adjust the capacity of the off-going clutch given the clutch torque profile to induce the slip speed. The controller 140 may further maintain the capacity of the off-going clutch above the minimum threshold needed for the off-going clutch to remain at least partially engaged during the transition. The controller 140 may fully disengage the off-going clutch after the oncoming clutch is synchronized and engaged.

The controller 140 may control the engagement of the oncoming clutch using the selected clutch slip speed profile. That is, the controller 140 may synchronize and engage the oncoming clutch as defined by the shift profile. To synchronize the oncoming clutch, the controller 140 may control the clutch slip speed profile of the oncoming clutch to substantially zero. Once synchronized, the controller 140 may control the capacity of the oncoming clutch in accordance with the selected shift profile to engage the oncoming clutch.

At decision block 335, the controller 140 may determine whether the vehicle 100 is operating in the target operating mode. For example, the controller 140 may determine whether the off-going clutch has successfully disengaged and whether the oncoming clutch has successfully engaged based on, e.g., observed slip of the off-going clutch or the oncoming clutch. That is, the controller 140 may expect to observe slip in the off-going clutch since an observed slip indicates that the off-going clutch has successfully disengaged. Furthermore, the controller 140 may expect to observe a slip speed of substantially zero in the ongoing clutch since a slip speed of substantially zero may indicate that the oncoming clutch has successfully engaged.

If the off-going clutch has successfully disengaged and the oncoming clutch has successfully engaged, the controller 140 may determine that the vehicle 100 is operating in the target operating mode, and the process 300 may continue at block 305. If the controller 140 determines that the off-going clutch has not disengaged and/or that the oncoming clutch is not yet engaged, the controller 140 may determine that the vehicle 100 has not completed the transition to the target operating mode and continue to control the off-going and oncoming clutches.

The controller 140 may repeat decision block 335 for a predetermined number of iterations or amount of time until the vehicle 100 is operating in the target operating mode. If, however, decision block 335 is repeated for the predetermined number of iterations or amount of time without an indication that the vehicle 100 is operating in the target operating mode, the controller 140 may recognize a fault and/or take a remedial action.

As described above, the present approach is used to generate on-coming clutch slip based on output speed and the engine start speed profile, with two constraints: (1) the target clutch slip speed is zero to enable synchronous engagement of the on-coming clutch, and (2) the sign of the off-going clutch is maintained to prevent output torque reversal. That is, the speed of the off-going clutch is controlled toward in a direction ensuring that output torque is always positive.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine configured to generate an engine torque;
a first motor configured to generate a first motor torque;
a second motor configured to generate a second motor torque;
a gearbox configured to receive at least one of the engine torque, the first motor torque, and the second motor torque;
an oncoming clutch configured to engage during a transition to a target operating mode and transfer the engine torque to the gearbox during the target operating mode;
an off-going clutch configured to transfer a reactive torque to the gearbox during the transition to the target operating mode, wherein the off-going clutch is configured to be disengaged during at least a portion of the target operating mode; and
a controller configured to simultaneously control the torque capacity of the off-going clutch and the engagement of the oncoming clutch during the transition to the target operating mode, wherein:

the controller is configured to control the reactive torque of the off-going clutch during the transition using engine and motor torques associated with the target operating mode; and the controller is configured to control the engagement of the oncoming clutch during the transition using a shift profile associated with the target operating mode.

2. A vehicle as set forth in claim 1, wherein the controller is configured to control the reactive torque of the off-going clutch by controlling the engine and motor torques and engine and motor accelerations during the transition to the target operating mode.

3. A vehicle as set forth in claim 1, wherein the controller is configured to control a capacity of the off-going clutch during the transition based at least in part on the clutch torque profile.

4. A vehicle as set forth in claim 1, wherein the controller is configured to select the clutch torque profile based at least in part on an output torque profile associated with the transition to the target operating mode.

5. A vehicle as set forth in claim 1, wherein the controller is configured to identify a speed profile associated with the transition to the target operating mode.

6. A vehicle as set forth in claim 5, wherein the speed profile defines a change in a desired input speed of the gearbox during the transition.

7. A vehicle as set forth in claim 5, wherein the controller is configured to select the shift profile based at least in part on the identified speed profile.

8. A vehicle as set forth in claim 1, wherein the controller is configured to control a capacity of the oncoming clutch during the transition based at least in part on the shift profile.

9. A vehicle as set forth in claim 1, wherein the controller is configured to synchronize the oncoming clutch during the transition and prior to engaging the oncoming clutch.

10. A vehicle as set forth in claim 9, wherein the controller is configured to control a slip speed of the oncoming clutch to substantially zero to synchronize the oncoming clutch.

11. A vehicle as set forth in claim 1, wherein the controller is configured to release the off-going clutch after the oncoming clutch is engaged.

12. A vehicle as set forth in claim 1, wherein the controller is configured to simultaneously control the reactive torque of the off-going clutch and the engagement of the oncoming clutch during the transition to the target operating mode.

13. A vehicle comprising:
an engine configured to generate an engine torque;
a first motor configured to generate a first motor torque;
a second motor configured to generate a second motor torque;
a gearbox configured to receive at least one of the engine torque, the first motor torque, and the second motor torque;
an oncoming clutch configured to engage during a transition to a target operating mode and transfer the engine torque to the gearbox during the target operating mode;
an off-going clutch configured to transfer a reactive torque to the gearbox during the transition to the target operating mode, wherein the off-going clutch is configured to be disengaged during at least a portion of the target operating mode; and
a controller configured to wherein the controller is configured to simultaneously control the reactive torque of the off-going clutch and the engagement of the oncoming clutch during the transition to the target operating mode;
wherein the controller is configured to select a clutch torque profile based at least in part on an output torque profile associated with the transition to the target operating mode and control the reactive torque of the off-going clutch during the transition by controlling a slip speed of the off-going clutch in accordance with the selected clutch torque profile;
wherein the controller is configured to identify an input speed profile associated with the transition to the target operating mode, select a clutch slip speed profile based at least in part on the input speed profile, and control the engagement of the oncoming clutch during the transition based at least in part on the selected shift profile, and wherein the controller is configured to synchronize the oncoming clutch before engaging the oncoming clutch and disengage the off-going clutch after the oncoming clutch is engaged.

* * * * *